United States Patent [19]

Kelly et al.

[11] 4,452,395
[45] Jun. 5, 1984

[54] NOZZLE ASSEMBLY FOR A REACTION ENGINE

[75] Inventors: Patrick J. Kelly; Robert D. Hackett, both of St. Charles County, Mo.

[73] Assignee: McDonnell Douglas Corporation, St. Louis, Mo.

[21] Appl. No.: 326,496

[22] Filed: Dec. 2, 1981

[51] Int. Cl.³ .............................................. F02K 1/42
[52] U.S. Cl. ........................... 239/265.15; 239/265.27
[58] Field of Search ...................... 239/265.11, 265.15, 239/265.19, 265.25, 265.27; 244/12.5, 23 D; 60/263, 251, 270.1, 271, 230

[56] References Cited

U.S. PATENT DOCUMENTS

| | | | |
|---|---|---|---|
| 2,612,747 | 10/1952 | Skinner | 239/265.19 |
| 3,036,429 | 5/1962 | Schairer | 239/265.19 X |
| 3,970,253 | 7/1976 | Burkes et al. | 239/265.19 |
| 4,327,868 | 5/1982 | Burkes, Jr. | 239/265.19 X |

Primary Examiner—Andres Kashnikow
Attorney, Agent, or Firm—Gravely, Lieder & Woodruff

[57] ABSTRACT

A reaction engine, such as a ramjet engine, has a nozzle assembly which maintains acceptable combustion chamber pressures during both high thrust and low thrust modes of flight. To this end, the engine has a primary nozzle in which a swing disc is located, and the disc turns from an open position in which it lies parallel to the axis of the primary nozzle to a closed position in which it lies across and blocks the primary nozzle. The disc contains secondary nozzles which are considerably smaller than the primary nozzle and are only effective when the disc is in its open position. The secondary nozzles may initially be filled with a flow smoothing material to prevent turbulence when the swing disc is in its initial open position, but this material is dislodged when the disc moves to its closed position.

13 Claims, 10 Drawing Figures (a) (b) DISC OPEN
(c) (d) DISC CLOSED

NOZZLE ASSEMBLY FOR A REACTION ENGINE

BACKGROUND OF THE INVENTION

This invention relates in general to reaction engines and, more particularly, to nozzles for such engines.

The typical ramjet engine consists essentially of an inlet, a combustion chamber, a fuel metering apparatus for supplying fuel to the combustion chamber where it burns to produce elevated pressures, and a converging-diverging nozzle for converting the elevated pressure within the combustion chamber into useful thrust. Since ramjet engines are capable of operating at supersonic speeds they are particularly useful for propelling high speed aircraft.

Like any other aircraft engine, a ramjet engine must accommodate various conditions of flight, such as the high thrust required for acceleration and climb, the lower thrust required for high altitude cruising, and again the high thrust required for approach to the final destination at lower elevations. Since a ramjet engine operates most efficiently when the pressure within its combustion chamber is maximum-that maximum being determined by the configuration of the inlet to the engine-a single nozzle size will not maintain the maximum pressure for both the high thrust conditions of climb, where the specific fuel consumption is high, and the relatively low thrust required for cruising at high elevation, where the specific fuel consumption is low.

To maintain the high pressure needed for efficient engine operation under both high thrust and low thrust conditions, swing disc nozzles have been employed (See FIG. 1). Basically, these nozzles have the usual converging-diverging configuration which is capable of accelerating pressurized combustion gases generated ahead of it to supersonic velocities. A disc which is somewhat smaller than the throat of the nozzle is mounted in the nozzle on trunnions so that it can turn from a position parallel to the axis of the nozzle (FIGS. 1a & 1b) to a position perpendicular to the axis (FIGS. 1c & 1d). In the former the nozzle throat is practically unobstructed, and the engine will efficiently delive a large amount of thrust, assuming that sufficient fuel is supplied to the combustion chamber. On the other hand, in the latter or perpendicular position, the nozzle throat is actually an annulus surrounding the closed disc. This maintains the combustion chamber pressure relatively high when fuel is supplied to the chamber at a lesser rate and consequently the engine produces less thrust, which is desired for cruise conditions in the rarefied atmosphere of high altitudes. Also, because of the smaller throat area, the combustion gases experience a greater expansion between the throat and the nozzle exit. The velocity of the gases in the nozzle is therefore greater, and this improves the efficiency of the nozzle during cruise conditions.

While the conventional swing disc nozzle improves the efficiency of the engine operation at cruise conditions, operating under these conditions is still less than ideal. This derives from the fact that the closed disc around which the gases pass as they discharge from the nozzle produces aerodynamic drag. The drag or turbulence in turn reduces the efficiency of the engine, although the efficiency is still higher than it would be if the disc were not present.

Heretofore some engines have been provided with multiple nozzles, instead of a single large nozzle, the primary purpose of this arrangement being to reduce the overall length of the nozzle region and thereby make the engine more compact. However, nozzles of these types have not been modulated to accommodate the high thrust demands of climb and the low thrust demands of cruise.

SUMMARY OF THE INVENTION

One of the principal objects of the present invention is to provide a reaction engine with a nozzle assembly that enables the engine to operate efficiently under both high thrust conditions, where the specific fuel consumption is high, and under low thrust conditions, where specific fuel consumption is low. Another object is to provide a nozzle assembly of the type stated which, in effect, is a large convergent-divergent nozzle when the engine is operating at high thrust and is a multitude of smaller convergent-divergent nozzles when the engine is operating at low thrust. A further object is to provide a nozzle assembly of the type stated in which the multitude of smaller nozzles are contained within a disc that is mounted within the throat of the large nozzle, with the disc being able to swing within the throat from a position in which it lies along the axis of the throat and the nozzles in it are ineffective to a position in which it blocks the throat of the large nozzle and the gases generated by the engine pass through the disc nozzles. An additional object is to provide a nozzle assembly of the type stated in which the nozzles of the disc are covered so as not to adversely affect the flow of gases over the disc when the disc is in its open position, that is in the position in which it produces the least obstruction within the large nozzle. Still another object is to provide a nozzle assembly of the type stated in which the swing disc can be easily ejected to again operate the engine at high thrust. Yet another object is to provide a nozzle assembly of the type stated which is simple in construction and operation. These and other objects and advantages will become apparent hereinafter.

The present invention resides in a nozzle assembly having surfaces that define a primary nozzle and a disc that moves from an open position to a closed position with respect to the primary nozzle. The disc contains surfaces which define at least one secondary nozzle that is of smaller cross-sectional area than the primary nozzle, whereby the disc is in its open position, the thrust is derived from the primary nozzle, and when the disc is in its closed position, the thrust is derived from the secondary nozzle or nozzles. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
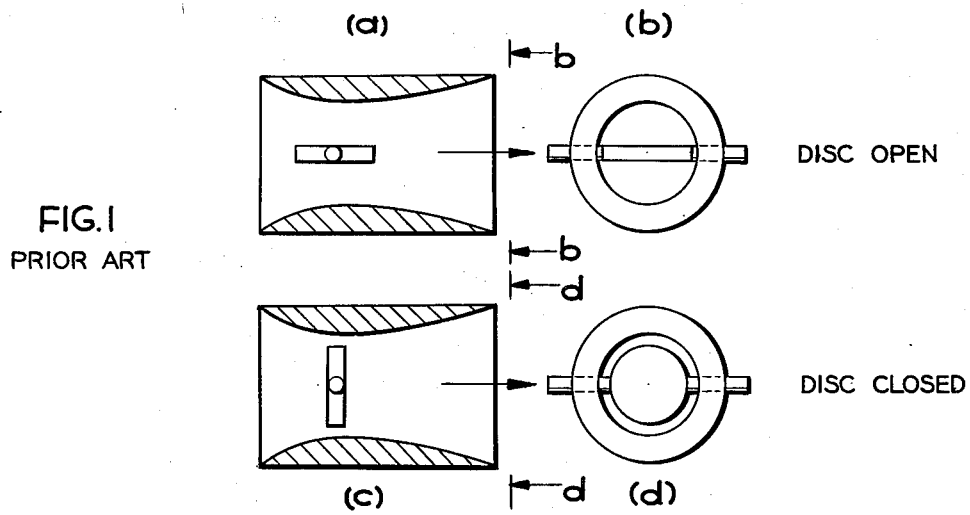
FIG. 1 is a series of sectional and end views of a conventional swing disc nozzle arrangement for improving engine efficiency under varying operating conditions, the swing disc being illustrated both parallel to the flow of gases (a & b) and transverse to the flow of gases (c & d)

Referring to the drawings (FIGS. 2-7), a ramjet engine has the usual inlet and also a combustion chamber 2 (FIGS. 2 & 4) in which air from the nozzle is mixed with a fuel and burned. In addition it has a nozzle assembly 4 through which the pressurized gases from the combustion chamber 2 pass and in so doing accelerate and impart thrust to the engine, so that the engine will propel an aircraft in which it is mounted. The engine has the capability of operating efficiency at high thrust in which the specific fuel consumption, that is the amount of fuel consumed per unit of time, is high. It also has the capability of operating efficiency at low thrust where the specific fuel consumption is low. Irrespective of the operating condition, the pressure within the combustion chamber remains high and near optimum values, thus ensuring that the engine will operate efficiently in all modes of flight.

Figure 2:
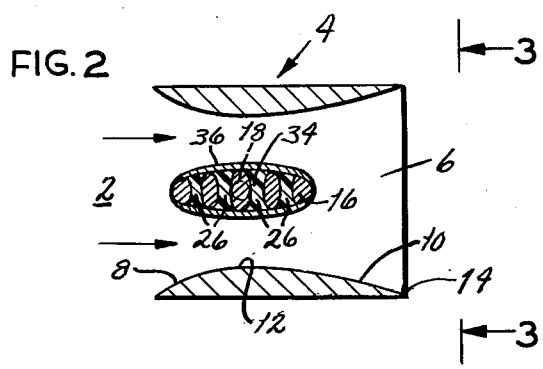
FIG. 2 is a sectional view of the swing disc nozzle assembly of the present invention with the swing disc in its open position.
Figure 4:
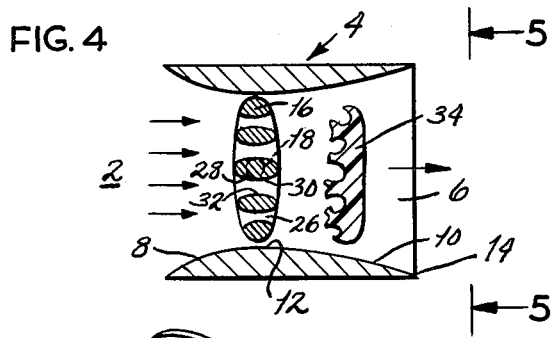
FIG. 4 is a sectional view of the nozzle assembly of the present invention with its swing disc in the closed position and the flow smoothing device being dislodged.

The nozzle assembly 4 includes an annular nozzle 6 having converging and diverging surfaces 8 and 10 that are presented respectively toward and away from the combustion chamber 2. The surfaces 8 and 10 merge at a throat 12 which is in the region of smallest diameter within nozzle 6 (FIGS. 2 & 4). The opposite or downstream end of the diverging surface 10 constitutes the exit 14 of the nozzle 6. As with any converging-diverging nozzle that is pressurized sufficiently at its upstream end, the pressurized gases from the combustion chamber 2 will accelerate in the region of the converging surface 8 and will reach the sonic velocity at the throat 12. As the gases pass out of the throat 12 and into the region of the diverging surface 10 they accelerate still further into the supersonic range. The size of the nozzle 6 is selected to derive the maximum thrust from the engine when the nozzle 6 is essentially unobstructed and the specific fuel consumption is at its highest.

Figure 5:
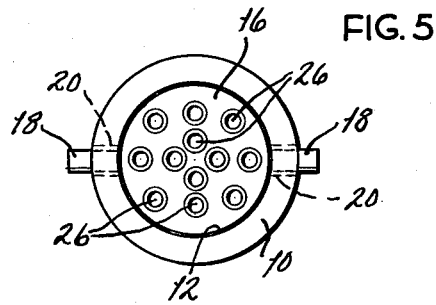
FIG. 5 is an end view of the nozzle assembly of FIG. 4 taken along line 5—5 of FIG. 4.
Figure 6:
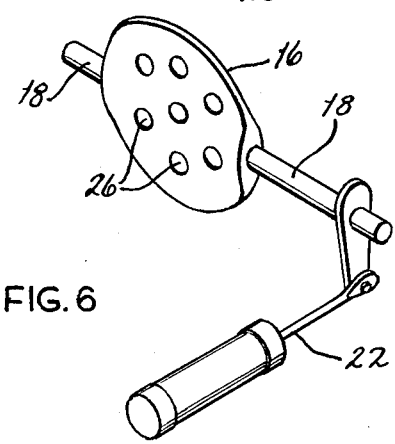
FIG. 6 is a perspective view of the swing disc and rotary actuator for it.
Figure 7:
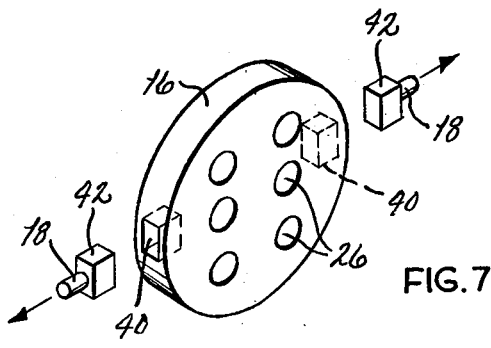
FIG. 7 is a perspective view of a modified swing disc and a disc release mechanism.

In addition, the nozzle assembly 4 includes a circular swing disc 16 that is essentially the same diameter as the throat 12, and indeed the disc 16 is mounted in the throat 12 such that it can swing from an open position (FIGS. 2 & 3) wherein it is parallel to and lies along the axis of the nozzle 6, to a closed position wherein it is perpendicular to the axis of the nozzle 6 (FIGS. 4 & 5). To this end, the disc 16 is fitted with trunnions 18 which project radially from it into bearings 20 located in the wall of the nozzle 6, the bearings 20 being aligned and oriented perpendicular with respect to the axis of the nozzle 6. The trunnions 18 fit loosely enough into the bearings 20 to enable them to rotate with relative ease, and as a consequence, the swing disc 16 will turn between the open position and closed position, there being approximately 90° of rotation between the two positions. In the open position the swing disc 16 lies along and parallel to the axis of the nozzle 6, whereas in the closed position it extends across the throat 12 perpendicular to the axis of the nozzle 6. As such it obstructs the nozzle 6 all the way out to the surface of the throat 12.

At least one of the trunnions 18 extends completely through the wall of the nozzle 6 and beyond that wall is connected with a rotary actuator 22 (FIG. 6) that is capable of imparting 90° of rotation to the trunnions 18. The actuator 22 is typically hydraulically operated, although it may be an electromechanical device as well. Similarly, where only one actuation is required, pyrotechnic actuating devices are suitable for use as the actuator 22.

Unlike the swing discs used in conventional nozzle assemblies, the swing disc 16 of the nozzle assembly 4 includes a plurality of passages which extend through it parallel to the axis of the disc 16, and each passage in itself is a secondary nozzle 26 having converging and diverging surfaces 28 and 30, respectively, and a throat 32 where the two surfaces 28 and 30 merge (FIG. 4). Each secondary nozzle 26 is, of course, considerably smaller than the primary nozzle 6, and the combined cross-sectional area of all of the secondary nozzles 26 is less than the cross-sectional area of the primary nozzle 6, even as slightly obstructed by the disc 16 when the disc 16 is parallel to the axis of the nozzle 6.

Figure 3:
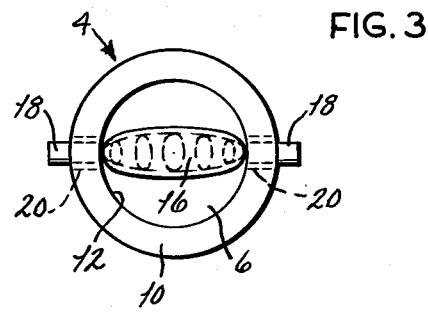
FIG. 3 is an end view of the nozzle of FIG. 2 taken along line 3—3 of FIG. 2.

During the initial operation of the engine when the aircraft to which it is mounted undergoes acceleration and climbs to a higher elevation, the swing disc 16 is in its open position, that is parallel to the axis of the nozzle 6 (FIGS. 2 & 3). As such the nozzle 6 possesses a large cross-sectional area at its throat 12 and is capable of delivering a large thrust, assuming that the specific fuel consumption is high. On the other hand, when the aircraft reaches cruise altitude where the atmosphere is more rarefied, and less thrust is required to sustain level flight at constant velocity, the rotary actuator 26 turns the swing disc 16 to its closed position where it blocks the primary nozzle 6 and renders that nozzle ineffective (FIGS. 3 & 4). Instead, all of the gases now pass through the secondary nozzles 26 in the disc 16, which, being more constricted, maintain about the same ratio between the pressure of the combustion chamber 2 and the ambient pressure, despite the lower specific fuel consumption and the rarefied atmosphere.

To prevent the nozzle 30 of the swing disc 16 from generating excessive turbulence in the flow of gases through the primary nozzle 16 when the swing disc 16 is in its open position, the swing disc 16 is provided with a flow smoothing material 34 (FIG. 2) which may be a substance that is cast into the nozzles 26 and over one face of the disc 16, that being the downstream face when the disc 16 is turned to its closed position. The material 34 should char or otherwise weaken in the presence of the high temperature airstream passing through the primary nozzle 6. Indeed, the material 34 should weaken to the extent that it will be ejected easily from the nozzles 26 when the swing disc 16 is moved to its closed position (FIG. 4). Various silicone rubber compositions are suitable for the flow smoothing material 34.

In addition, both surfaces of the swing disc 16 may be initially covered with an ablative coating 36 (FIG. 2) that protects the underlying flow smoothing material 34. The coating 36 may be a low burn rate solid propellant that is consumed during the initial operation of the engine or a thin ablative material such as silica phenolic. The coating 36 therefore does not interfere with the ejection of the flow smoothing material 34.

OPERATION

After being brought to its operational speed, usually by means of some type of booster, the engine is operated at a high fuel flow rate to the combustion chamber 2, that is at a high specific fuel consumption, this being necessary to accelerate the aircraft and enable it to climb to higher elevations. In order to obtain this high thrust, the swing disc 16 is in its open position where it is parallel to the flow of the gases through the nozzle 6 (FIGS. 2 & 3). Moreover, the flow smoothing material 34 is in place within the secondary nozzles 26 and is covered by the ablative coating 36 so the hot gases from the combustion chamber 2 pass by the swing disc 16 without experiencing a significant amount of turbulence. However, during this period of high thrust operation the ablative coating 36 is consumed and the flow smoothing material 34 is charred. Indeed, by the time the aircraft has reached the cruise elevation, the ablative coating 36 no longer remains, and the flow smoothing material 34 is charred to the extent that it has low structural strength.

Once the cruise elevation is attained, the rotary actuator 22 turns the trunnions 18, to which it is connected, 90° and this rotates the swing disc 16 from its open position to its closed position (FIGS. 4 & 5). At the same time, the rate at which the fuel is supplied to the combustion chamber 2 is reduced substantially or, in other words, the engine transforms to an operating condition of low specific fuel consumption. As the swing disc 16 turns the converging surfaces 28 of the secondary nozzles 26 are presented upstream toward the combustion chamber 2, and the increase in pressure within these regions of the nozzles 26 is enough to dislodge the flow smoothing material 34 from the swing disc 16 (FIG. 4). The flow smoothing material 34 is carried out of the diverging surface 10 of the primary nozzle 6 with the high velocity gas stream.

With the discharge end of the combustion chamber 2 choked by the secondary nozzles 26, the combustion chamber 2 continues to operate at near optimum pressure despite the reduction in the specific fuel consumption and the rarefied atmosphere.

The aircraft continues with its engine operating in the cruise mode for most of the flight. The cruise mode is, of course, characterized by low specific fuel consumption and the swing disc 16 presented in its closed position.

As the aircraft nears its destination it enters an approach phase of the flight where it descends to a lower elevation and its velocity decreases. Because of the greater density of the atmosphere at the lower elevation, the engine must again produce high thrust to propel the aircraft through the dense atmosphere. As a consequence the specific fuel consumption is increased and simultaneously the rotary actuator 22 is energized to move the swing disc 16 back to its open position. In this condition the thrust is derived from the primary nozzle 6 and is sufficient to maintain the aircraft airborne during the approach mode. However, some turbulence and resulting loss of efficiency does occur as the gases flow past the swing disc 16, for the nozzles 26 within it are not covered by a steamlined surface as in the initial climb mode of the flight.

Thus, the nozzle assembly 4 enables the engine to operate at near peak efficiency during all three modes of flight, and particularly, during the modes that consume the greatest amount of fuel, that is during the climb mode and the cruise mode. This high efficiency in turn extends the range of the aircraft significantly.

To further improve the efficiency of the engine during the approach mode, the nozzle assembly 4 may be modified such that it ejects the swing disc 16 at the end of the cruise mode. Thus, during the approach mode the nozzle 6 is completely unobstructed. To this end, the trunnions 18 are not attached directly to the swing disc 16. Instead, the swing disc 16 has sockets 40 (FIG. 7) of polygonal or splined configuration and the trunnions 18 have ends 42 of matching configuration. Indeed, the ends 42 of the trunnions 18 fit into the sockets 40 so that when the trunnions 18 are turned on by the rotary actuator 22, the swing disc 16 will likewise turn. In addition to the rotary actuator 22, the trunnions 18 are also connected to linear actuators (not shown) which pull the trunnions 18 outwardly away from the swing disc 16. Indeed, the linear actuators move the trunnions 18 axially a distance sufficient to free their shaped ends 42 from the sockets 40 in the sides of the disc 40, and when the trunnions 18 are so withdrawn, the swing disc 16 is released and will be propelled from the primary nozzle 6 by the hot gases issuing from it. Thus, the gases are accelerated to supersonic velocities within the primary nozzle 6 without any interference from the swing disc 16.

The nozzle assembly 4 may also be used in conjunction with other types of reaction engines such as rocket engines or even turbojet engines.

This invention is intended to cover all changes and modifications of the example of the invention herein chosen for purposes of the disclosure which do not constitute departures from the spirit and scope of the invention.

What is claimed is:

1. A nozzle assembly for a reaction engine, said nozzle assembly comprising: means defining a primary nozzle configured to derive thrust from gases that pass through it; a disc mounted on the means defining the primary nozzle for pivoting movement between an open position and a closed position with respect to the nozzle, the disc permitting gases to flow generally freely from the primary nozzle when the disc is in its open position and generally obstructing the primary nozzle when in its closed position, the nozzle containing surfaces which define at least one secondary nozzle which is configured to derive thrust from gases that pass through it, the total cross-sectional area of the secondary nozzle being less than the cross-sectional area of the primary nozzle, whereby when the disc is in its open position, the thrust is derived from the primary nozzle, and when the disc is in its closed position, the thrust is derived from the secondary nozzle; means for moving the disc between its open position and its closed position; and flow smoothing means on the disc for closing the secondary nozzle when the disc is in its open position so that the gases passing through the primary nozzle flow smoothly over the disc without experiencing excessive turbulence.

2. A nozzle assembly according to claim 1 wherein the primary nozzle has a convergent section, a divergent section, and a throat between the two sections; and wherein the disc is mounted in the region of the throat.

3. A nozzle assembly according to claim 2 wherein the disc pivots about an axis that is perpendicular to the axis of the primary nozzle.

4. A nozzle assembly according to claim 1 wherein the disc has a plurality of secondary nozzles.

5. A nozzle assembly according to claim 1 wherein the flow smoothing means is easily dislodged from the disc by the gases when the disc is turned to its closed position, whereby the gases will thereafter pass through the secondary nozzle.

6. A nozzle assembly according to claim 5 wherein the material from which the flow smoothing means is made will weaken substantially at elevated temperatures.

7. A nozzle assembly according to claim 5 wherein the flow smoothing means fills the secondary nozzle.

8. A nozzle assembly according to claim 7 and further comprising an ablative material extending over the disc and the flow smoothing means in the nozzle of the disc, the ablative material being capable of being consumed in the presence of the hot gases passing out of the primary nozzle when the disc is in its open position.

9. In a reaction engine having a combustion chamber, an improved nozzle assembly behind the combustion chamber for converting high pressure gases generated in the combustion chamber into thrust, said nozzle assembly comprising converging and diverging surfaces defining a primary nozzle having a longitudinal axis; a swing disc mounted in the primary nozzle for pivoting movement about an axis generally perpendicular to the longitudinal axis of the primary nozzle, the disc being capable of pivoting between an open position, wherein it is generally parallel to the longitudinal axis of the primary nozzle and allows gases to flow out of the primary nozzle along the converging and diverging surfaces of that nozzle, and a closed position, wherein it is generally perpendicular to the axis of the primary nozzle and extends out to a surface of the primary nozzle to obstruct the primary nozzle, the disc containing at least one secondary nozzle which has converging and diverging surfaces but is of lesser cross-sectional area than the primary nozzle, the secondary nozzle being positioned in the disc such that it lies generally perpendicular to the longitudinal axis of the primary nozzle when the disc is in its open position and generally parallel to the longitudinal axis of the primary nozzle when the disc is in its closed position, whereby when the disc is in its open position thrust is derived from the primary nozzle and when the disc is in its closed position thrust is derived from the secondary nozzle, the effective cross-sectional area available for the passage of high pressure gases from the nozzle assembly being substantially greater when the disc is in its open position than when it is in its closed position; and means for moving the disc from the open position to the closed position.

10. The combination according to claim 9 wherein the converging and diverging surfaces of the primary nozzle merge at a throat and the disc fits within the region of the throat and is substantially the same size as the throat so as to render the converging and diverging surfaces of the primary nozzle ineffective when the disc is in its closed position.

11. The combination according to claim 9 wherein the disc contains several secondary nozzles, all of which lie substantially parallel to each other within the disc.

12. A nozzle assembly for a reaction engine, said nozzle assembly comprising: means defining a primary nozzle configured to derive thrust from gases that pass through it; a disc mounted on the means defining the primary nozzle for movement between an open position and a closed position with respect to the nozzle, the disc permitting gases to flow generally freely from the nozzle when the disc is in its open position and generally obstructing the primary nozzle when in its closed position, the nozzle containing surfaces which define at least one secondary nozzle which is configured to drive thrust from gases that pass through it, the total cross-sectional area of the secondary nozzle being less than the cross-sectional area of the primary nozzle, whereby when the disc is in its open position, the thrust is derived from the primary nozzle, and when the disc is in its closed position, the thrust is derived from the secondary nozzle; and means for releasing the disc such that it will be ejected from the primary nozzle by gases passing out of the nozzle.

13. In a reaction engine having a combustion chamber, an improved nozzle assembly behind the combustion chamber for converting high pressure gases generated in the combustion chamber into thrust, said nozzle assembly comprising converging and diverging surfaces which merge at a throat to define a primary nozzle; a swing disc mounted within the region of the throat of the primary nozzle for pivoting movement about an axis transverse to the nozzle, the disc being about the same size as the throat and being capable of pivoting between an open position wherein it allows gases to flow out of the nozzle along the converging and diverging surfaces and a closed position wherein it obstructs the primary nozzle so as to render the converging and diverging surfaces of that nozzle substantially ineffective, the disc containing at least one secondary nozzle which has converging and diverging surfaces but is of lesser cross-sectional area than the primary nozzle; means for moving the disc from the open to the closed position; and flow smoothing means for isolating the secondary nozzle from gases flowing through the primary nozzle when the disc is in its open position.

* * * * *

UNITED STATES PATENT AND TRADEMARK OFFICE
CERTIFICATE OF CORRECTION

PATENT NO. : 4,452,395
DATED : June 5, 1984
INVENTOR(S) : Patrick J. Kelly and Robert D. Hackett It is certified that error appears in the above-identified patent and that said Letters Patent is hereby corrected as shown below:

Column 1, line 42, "delive" should be "deliver"

Column 3, line 21, "efficiency" should be "efficiently"

Column 3, line 24, "efficiency" should be "efficiently"

Claim 12, line 19 of column 8, "drive" should be "derive"

Signed and Sealed this

Ninth Day of October 1984

[SEAL]

Attest:

Attesting Officer

GERALD J. MOSSINGHOFF

Commissioner of Patents and Trademarks